Aug. 4, 1953     W. J. LEWIS     2,647,431
EXPANSION BOLT
Filed Feb. 15, 1950     2 Sheets-Sheet 2

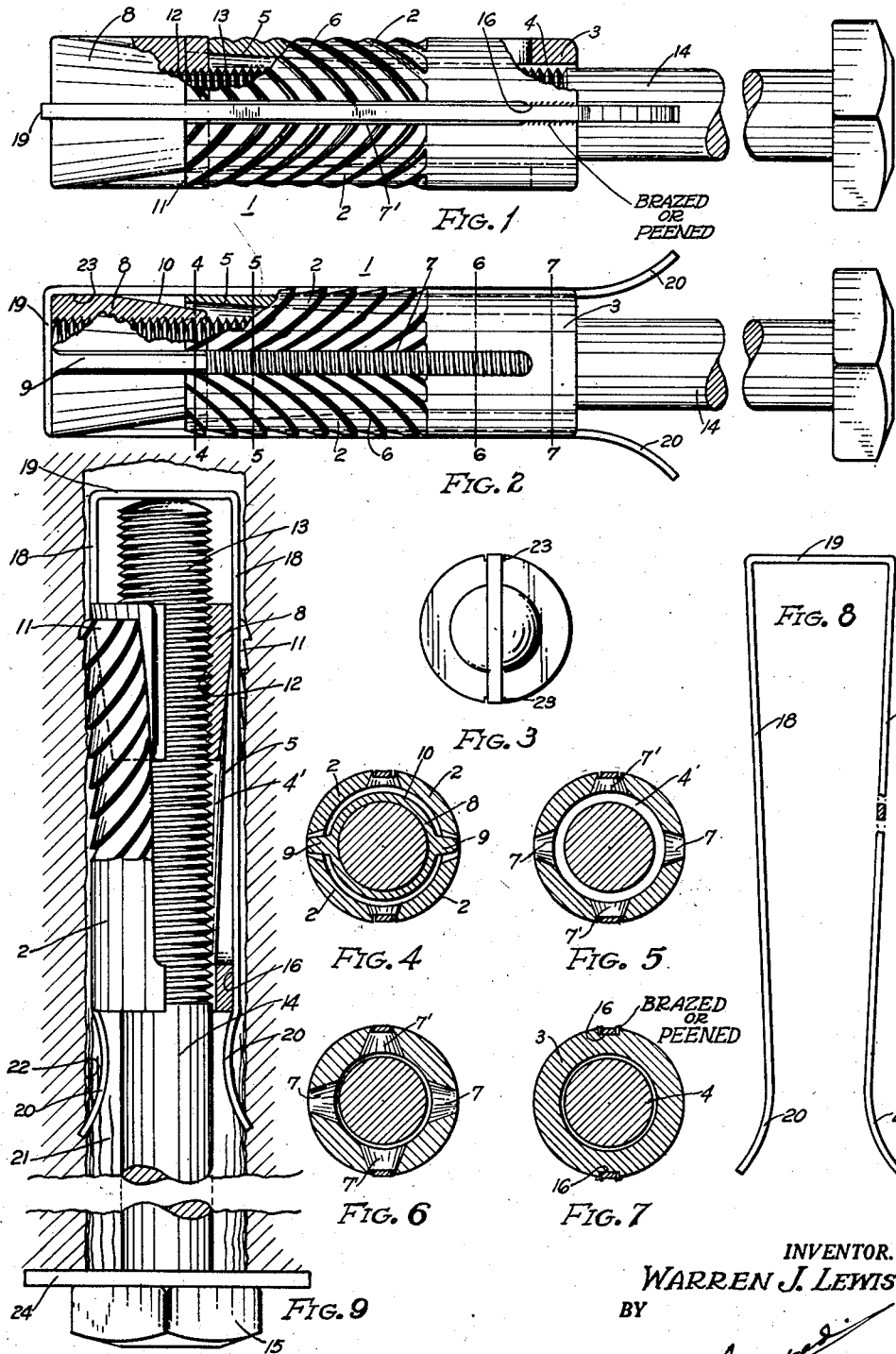

INVENTOR.
WARREN J. LEWIS
BY
ATTORNEY

Patented Aug. 4, 1953

2,647,431

UNITED STATES PATENT OFFICE 2,647,431

EXPANSION BOLT

Warren J. Lewis, Mansfield, Ohio, assignor to The Ohio Brass Company, Mansfield, Ohio, a corporation of New Jersey Application February 15, 1950, Serial No. 144,258

12 Claims. (Cl. 85—2.4)

1

My invention relates to expansion bolts and has particular reference to such devices as are capable of supporting roofs in mines although their use is not so limited.

One object of my invention is to provide a device provided with an expansion shell or shield and a wedge or expander for expanding the shell or shield.

Another object is to provide the shell or shield with means to engage the side wall of a drilled opening to prevent the rotation of the shell relative to the said wall.

Another object of my invention is to provide the shell or shield with means to temporarily support the device after its initial insertion in a hole provided therefor until the shell may be expanded sufficiently to grip the side wall of the hole.

Still another object of my invention is to provide an expandable shell and a wedge or expander therefor with a stud associated with the wedge and to further provide the shell with means to be engaged by the end face of the associated end of the stud whereby longitudinal movement of the stud is arrested and the wedge moved longitudinal of the shell and forced into the shell to be expanding the shell into engagement with the wall of the hole when the stud is rotated.

Still another object is to provide the shell with yieldable means to engage the wall of the hole when the shell is moved into position in the hole to support the device and prevent its rotation within the hole.

A still further object of my invention is to provide an expansion bolt with means associated with the shell and engageable by the end of the stud whereby the shell and wedge may be assembled on the end of the stud and moved into position in the opening or hole made therefor.

A still further object of my invention is to provide means for maintaining the parts in assembled relation prior to installation.

The foregoing objects of my invention, as well as other objects and advantages, will be readily appreciated from the following detailed description and the accompaying drawings, wherein—

Fig. 1 is a side view in partial section of one form of my invention.

Fig. 2 is another side view in partial section of Fig. 1 taken at 90 deg. therefrom.

Fig. 3 is an end view of Fig. 2 looking toward the left end thereof.

Fig. 4, 5, 6 and 7 are sections on the corresponding section lines of Fig. 2.

Fig. 8 is a bail which I employ in connection with the shell or shield of Figs. 1 and 2.

2

Fig. 9 shows in partial section the device of Figs. 1 and 2 as installed in the roof of a mine or similar formation.

Figure 10:
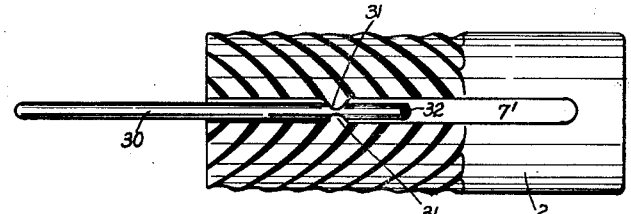
Figure 11:
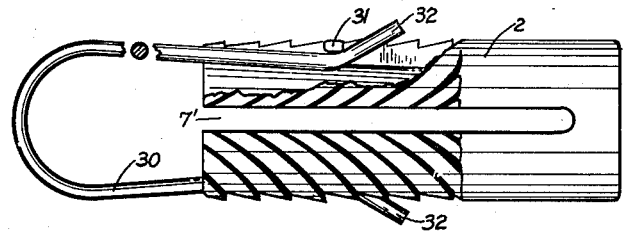

Figs. 10 and 11 are two side views taken at 90 deg. from each other showing a modified shell and bail from that shown in Figs. 1 and 2. It is to be understood that an expander or wedge would also be included as in Figs. 1 and 2. Fig. 11 is shown in partial section.

Figure 12:
Figures 13, 19:
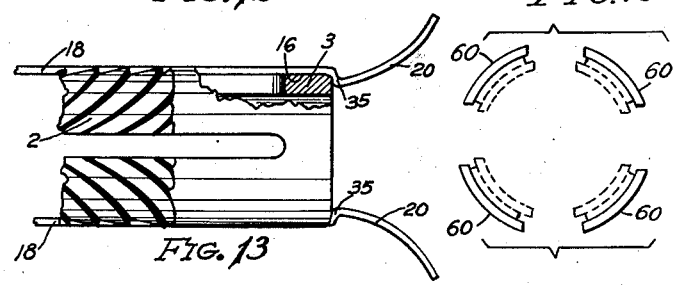

Figs. 12 and 13 show a modification of the lower end of the shell and bail shown in Figs. 1 and 2 in which the bail is mechanically interlocked with the shell at its lower end against relative longitudinal movement. Fig. 13 is shown in partial section.

Figure 14:
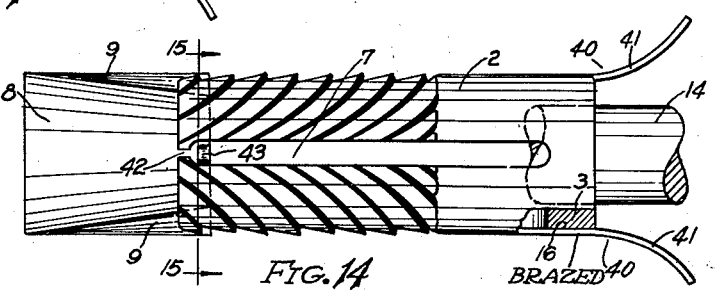

Fig. 14 shows a shell and wedge in partial section in which the wedge is shown as interlocked with the shell.

Figure 15:
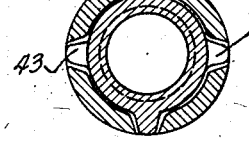

Fig. 15 is a section on the line 15—15 of Fig. 14.

Figures 16, 17:
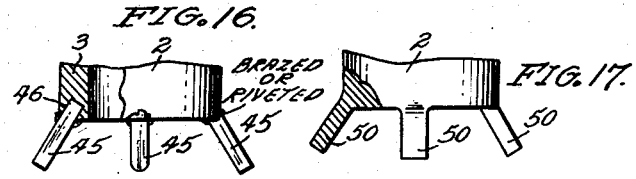

Fig. 16 shows a modified lower end of the shell portion in partial section in which separately formed holding means is associated with the shell portion and secured thereto by riveting or brazing.

Fig. 17 is another view in partial section of a modified lower end of the shell in which holding means is cast integral with the shell.

Figure 18:
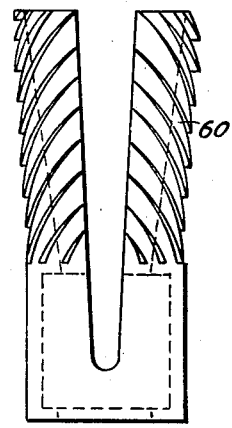

Fig. 18 is a side view of a shell only, in which the outer end of the shell is normally larger than the inner end.

Fig. 19 is a view of the outer end of shell shown in Fig. 18.

In the various figures, like elements are indicated by like characters.

In the preferred embodiment of my invention I provide a hollow shell or shield 1 with a plurality of yieldable prongs or tongues 2 which are free at one end but secured in fixed relation at the other end. At the fixed or inner end of the prongs a collar 3 is formed and an opening 4 is provided through the collar for the passage of a stud.

The inner face of each prong or tongue is tapered as shown at 5 and the outer surface of the prong for a distance is corrugated or serrated as shown at 6. The prongs are spaced apart by intervening longitudinal slots 7 and 7'.

The shell is provided with a hollow passage 4' which is a continuation of the opening 4 through the collar. A wedge or expander 8 provided with longitudinal guides 9 is located in the upper or outer end of the shell with the guides 9 positioned in the slots 7. There are preferably four slots (7—7') and two oppositely disposed guides 9 which also function to prevent relative rotation of the wedge and shell.

The outer face 10 of the expander is tapered and coacts with the tapered faces 5 such that as the wedge is forced into the upper end of the shell at the free or upper ends 11 of the prongs, the upper portion of the prongs will be forced outward giving the inner surface of the prongs a somewhat convex shape. The wedge is provided with a threaded opening 12 therethrough to receive a sufficiently threaded end 13 of stud 14 which may be provided with an integral head 15 at its lower or outer end or a short threaded portion of the stud proper and a nut thereon may be substituted for the head 15.

From the lower end of the slots 7' oppositely disposed grooves 16 are formed in the shell which extend to the lower end of the shell or collar 4.

Associated with the shell is a bail 17 formed of resilient material such as steel which may be round, rectangular or otherwise in cross section. The bail is provided with oppositely disposed legs 18 connected at the upper end by bight or bridging portion 19 forming a loop-shaped portion projecting from the shell and the lower ends of the legs bent outwardly from the shell to produce resilient spurs 20 to engage the wall of the hole 21 in the mine roof to prevent initial rotation of the shell relaitve to the mine roof until the shell grips the wall 22.

The bail 17 is positioned in the slots 7' and also in the grooves 16 and also in oppositely disposed grooves 23 in the wedge 8. This keeps the leg portions 18 of the bail within the limits of diameter of the shell and wedge.

To attach the bail in position and to prevent longitudinal movement relative to the shell the bail may be securely fixed to the shell at the grooves 16 by the application of brazing metal thereto or the edge of the shell along the grooves 16 adjacent the bail legs may be raised and peened over to engage the bail.

The upper end of the legs 18 of the bail project above the upper end of the shell so that the bight or connecting portion 19 of the bail is spaced from the upper end of the shell in an amount to permit the lower end of the wedge to just enter the hollow 4' of the shell when the upper end of the wedge engages the portion 19 of the bail.

The stud 14 may be of any length necessary to meet requirements, in some cases the stud 14 may be as much as six feet long depending upon the condition of the mine roof.

To install the device shown in Figs. 1 and 2 in the mine roof, a hole 21 is first drilled of required depth and slightly larger in diameter than the diameter of the shell. The device as shown assembled in Figs. 1 and 2 is then inserted in the prepared hole 21 by shoving the stud together with the shell, wedge and bail into position in which case the spurs yield as those in Fig. 9. In some cases the yielding spurs 20 of the bail will offer initial support to the device if the hole is of sufficiently stiff material but in all cases they will bite into the wall 22 and prevent initial rotation of the shell relative to the wall 22 as shown in Fig. 9. It is customary to insert the device into the drilled hole until the head 15 engages an enlarged washer 24 in contact with the outer surface of the mine roof.

If the stud 14 is now rotated it will do so relative to all the other parts of the device and if such rotation is in a clockwise direction with the upper end of the stud threaded right hand the wedge will be forced to move downwardly into the upper end of the shell thereby expanding the prongs or tongues 2 into secure engagement with the wall 22 of the drilled hole, and at the same time the head 15 and washer 24 will be drawn up tightly against the lower face of the mine roof.

In pushing the parts assembled as in Figs. 1 and 2 into the hole 21 the end face of the stud 14 will engage the portion 19 of the bail thus assuring the proper positioning of the shell and wedge within the hole 21.

Without the shell being supported on the end face the portion 14 while the shell is being expanded, the tendency will be for the shell to move downwardly due to friction between the wedge and the shell as the wedge is forced into the shell but this is prevented by the engagement of the stud with the portion 19 of the bail which is fixed to the shell.

In Figs. 10 and 11 is shown a modification of the device of Figs. 1 and 2 in that the spring bail 30 is secured to the shell by means of the inwardly projecting lugs 31 which are preferably cast integral with the tongue members of the shell. The free ends 32 of the bail project beyond the periphery of the shell in order to engage the wall 22 and prevent rotation of the shell relative to the wall 22. It will be understood that the shell and bail shown in Figs. 10 and 11 in a complete device will be provided with a wedge 8 and stud 14 as in the case of Figs. 1 and 2.

In Figs. 12 and 13 the bail 17 of Figs. 1 and 2 is modified by providing the lower end of the legs 18 with inwardly projecting shoulders 35 which engage the lower face of the shell and thus prevent the upward movement of the bail relative to the shell 2 hence the bail will function as that of Figs. 1 and 2 to raise the shell and wedge into position in the hole 21 and hold or assist in holding the shell against downward movement during expansion. The bail is provided with the resilient spurs 20 which engage the wall 22 and rest in the grooves 16 whereby rotation of the shell 2 relative to the wall 22 is prevented.

In Fig. 14 is modified shell, wedge and resilient means, the latter to prevent rotation of the shell 2 within a hole 21. Here the bail is omitted but two resilient members 40 are substituted which are provided with spurs 41 and short portions positioned in the grooves 16 and secured to the shell by brazing, peening or otherwise. The shell is provided with two inwardly projecting lugs 42 in the oppositely disposed slots 7 and engaged by oppositely disposed lugs 43 on the lower end of the wedge 8.

The lugs 43 engaging the lugs 42 prevent the disengagement of the wedge from the shell and the device is provided with a stud 14 as in the case of Figs. 1 and 2. The stud, assembled with the wedge as in Figs. 1 and 2 is sufficient to position the shell and wedge in proper place in the mine roof and the yielding spurs 41 will prevent rotation of the shell as the stud is rotated to draw the wedge into the shell to expand the same and should be stiff enough to prevent the downward movement of the shell as the shell is expanded.

In Fig. 16 is a modified shell from that of Figs. 1 and 2 in that spurs or pins 45 are inserted in openings 46 formed in the collar portion 3 and secured therein by brazing or riveting. The pins 45 may be made of resilient material to yield as they engage the wall of the hole to prevent rotation of the shell and stiff enough to prevent downward movement of the shell during expansion.

Fig. 17 is a further modification of the shell 2 in that it is provided with a plurality of spurs or pins 50 cast integral with the shell and are somewhat yielding in view of the shell and lugs being formed of malleable metal such as malleableized cast iron. The spurs 50 perform the same functions as the resilient members 41 of Fig. 14.

In Figs. 1 to 14 inclusive the shell is shown as of substantially uniform diameter at both ends but I have found that there is an advantage in having the upper or free end of the prongs or tongues spread in order to more nearly fill the hole 21 and since the shell is formed of a malleable metal, the prongs will readily bend inwardly as the device is positioned in the hole if the spread is greater than the hole diameter and in such case the engagement between the prongs and the wall 22 will often be sufficient to prevent rotation of the shell and wedge relative to the wall 22 and the spurs if used will assist in preventing such relative rotation if the pressure of the spread prongs against the wall 22 is not sufficient.

This spreading of the upper or free end of the prongs may be brought about by casting the shell with a greater diameter of the prongs at their free end than the diameter of the lower or collar end or the shell may be cast of uniform diameter at both ends and the wedge forced into the shell at or prior to the time of assembly and then withdrawn before positioning the device in the roof hole 21 which will give the prongs a "set" thus providing somewhat greater diameter of the shell at the upper end.

A shell as described above is shown in Figs. 18 and 19 in which the prongs 60 are shown as normally spread giving the shell at the outer end a diameter preferably greater than that of the aperture in which it is to be installed. The prongs are easily bent inward by manual pressure to provide a smaller diameter, as shown by the dotted lines in Fig. 19, for insertion into the aperture. This is easily accomplished as the metal is usually quite yieldable and the prongs relatively thin and long. The inner surface of the prongs is tapered to coact with a tapered expander which in turn is threaded to receive a threaded stud.

It will be apparent that if the stud head 15 and washer 24 for some inadvertent reason should be spaced from the mine roof, the rotation of the stud 14 with its end face against the bridge or check portion 19, will cause the wedge to be forced into the shell and then expand the shell into secure engagement with the wall 22 and further rotation of the stud will cause the stud to move upwardly and the portion 19 will be bent upwardly or pushed aside or notched to break until the head 15 and washer 24 assume their proper position as in Fig. 9. It is well to drill the hole 21 somewhat deeper than actually needed for the above reason.

The ends of the expandable head has been referred to as the upper end and the lower end, however in certain claims the ends are referred to as the outer end and the inner end respectively as being more general terms.

Since certain changes in the above description and different embodiments of my invention may be made without departing from the spirit or scope thereof, it is my intention that the above disclosure and that shown in the accompanying drawings shall be considered illustrations and not as limitations.

I claim:

1. In an expansion bolt comprising, a hollow shell expandable at one end and non-expandable at the other end and a threaded expander movable longitudinally into the shell at the expandable end of the shell and a rotatable stud having a threaded engagement with the expander to move the expander, the combination with the shell of separately formed means secured to the shell in independent relation to the expandable end of the shell and bridging the said expandable end of the shell in spaced relation thereto, the said bridging means engageable by the end face of the stud whereby the rotation of the stud will move the expander into the shell to expand the same independent of the separately formed means when the stud is rotated.

2. In an expansion bolt for installation in a drilled aperture comprising, a hollow expandable member, an expander slidably mounted in the expandable member, a stud having a threaded engagement with the expander and projecting from each end of the expandable member, the combination with the expandable member of a separately formed loop-shaped member extending along the entire length of the expandable member and projecting longitudinally from one end of the expandable member, the loop-shaped member secured to the other end of the expandable member against relative longitudinal and rotatable movement, the loop-shaped member having means engageable by the end of the stud when rotated and means projecting longitudinally and laterally from the other end of the expandable member and adapted to engage the side wall of the said aperture independently of the expandable member to prevent initial rotation of the shell relative to the said wall.

3. In an expanding bolt for installation in an aperture comprising, a hollow expandable shell formed with a plurality of prongs integrally secured together at their inner ends, the prongs being spaced apart by intervening longitudinal slots whereby the prongs are independently bendable and the shell expandable at its outer end, an expander within the expandable shell to move longitudinally thereof, a stud having a threaded engagement with the expander and projecting beyond the outer end of the shell and movable longitudinally of the expander and shell when rotated relative to the expander, the combination with the shell of separately formed check means secured to the shell and projecting longitudinally from the outer end thereof to be engaged by the end of the projecting stud when rotated to check the longitudinal movement of the stud in an outward direction relative to the shell and to effect longitudinal movement of the expander relative to the stud in one direction when rotation of the stud is continued after its engagement with the said check means, the said check means having side members positioned in the slots and having their free ends secured to the shell whereby the shell may be expanded at its outer end without distorting the side members relative to their side position.

4. A shield for an expansion bolt comprising, an elongated hollow shell provided with a plurality of independent sections spaced apart, the shell adapted to receive an expander and a threaded stud, the said shell provided with a bail having spaced legs positioned in the spaces between the sections and extending longitudinally along opposite sides of the shell and projecting longitudinally beyond each end of the shell, the bight of said bail arranged to be engaged by an end of the stud and the free ends of the legs of said bail constructed and arranged to engage the wall of the opening in which the expansion bolt is mounted and means securing the bail to the shell to prevent longitudinal movement of the shell and bail.

5. An expansion bolt comprising, an expander, a stud threadably engaging the expander to move the expander, an elongated hollow shield expandable at one end and non-expandable at the other end, separately formed check means at the expandable end of the shield projecting therefrom and engageable by an end of the stud to effect longitudinal movement of the expander relative to the shield when the other end of the stud is rotated relative to the shield, grooves in the side face of the expander aligned with slots through the side wall of the shield in which the separately formed check means is positioned whereby the operation of the expander and the expansion of the shell will not affect the check means, and means associated with the expansion bolt to engage the side wall of an aperture to prevent relative rotation of the shell and side wall.

6. An expansion bolt comprising, a shield provided with slots in its wall to render the shield expandable, an expander slidably mounted in the shield, a stud having a threaded engagement with the expander to move the expander relative to the shield, a bail formed of resilient material associated with the shield and having a pair of spaced legs positioned in opposite slots and extending along opposite sides of the shield in free relation to the shield, the shield provided with a pair of shallow longitudinal grooves along its outer surface, a portion of the legs of said bail secured in the grooves, a portion of the legs of said bail projecting from one end of the shield and arranged to yieldably engage the side wall of an aperture and another portion of the bail arranged to be engaged by the stud whereby movement of the expander is effected without affecting the bail when the stud is rotated relative to the shield.

7. In combination, an elongated hollow shell, an expander therefor mounted in one end of the shell and threaded to receive a stud, the said shell provided with a separately formed bail having spaced leg portions projecting longitudinally from each end of the shell, the bridging portion of the said bail arranged to be engaged by the stud, the free ends of the bail projecting inwardly and then outwardly at the lower end of the shell to form shoulders to engage with the shell to prevent longitudinal movement of the bail in the direction of the said one end and the outwardly projecting portions of the legs forming spurs to engage the side wall of an aperture to prevent rotation of the shell relative to the wall of the aperture, the legs of the bail secured to the shell adjacent its lower end to prevent relative rotation of the shell and bail.

8. In combination, an elongated expandable shield, the shield provided with a plurality of spaced and yieldable prongs held in fixed relation at one end, the prongs being so formed that the shield at the free end of the prongs is of larger diameter than the diameter of the shield at the fixed end of the prongs whereby the prongs will engage the side wall of an aperture when the shield is positioned in the aperture and thereby resist rotation of the shield relative to the said wall, a threaded expander mounted in the enlarged end of the shield and means secured to the shield to prevent disassembly of the shield and expander, the said means comprising an elongated bail having its legs positioned along the expandable shield in oppositely disposed spaces between the prongs and secured to the shield against longitudinal movement relative to the shield, the bridged end of the bail projecting beyond the shield at the free end of the prongs, the projection of the bail beyond the shield being sufficient to permit the expander to move freely relative to the shield and to rest loosely in the shield so as to permit the prongs yielding inwardly when the shield and expander are positioned in aperture, the legs of the said bail being secured to the said fixed end of the shell to prevent relative movement of the shell and the bail.

9. In an expansion bolt comprising, a cylindrical shell formed with a plurality of elongated sections integrally connected together at their inner ends and having slots extending entirely through the shell wall between the sections and for the entire length of the sections and each section having an internally tapered surface and a threaded expander at the outer end of the shell and movable longitudinally into the shell and a rotatable stud having a threaded engagement with the expander to move the expander, the combination with the shell of separately formed means positioned in two of the said slots and secured to the shell adjacent the inner end of the slots, the said means bridging the outer end of the shell in spaced relation thereto, the bridging means engageable by the outer end face of the stud, whereby the rotation of the stud will effect movement of the expander into the shell to expand the same.

10. An expansion bolt comprising, an elongated hollow member formed with a plurality of prongs spaced from each other by longitudinal slots extending to a point adjacent the lower end of the member, an expander mounted in the member at the upper end thereof, a stud having a threaded engagement with the expander, the said hollow member provided with separately formed means projecting longitudinally from each end thereof, the projection from the lower end of the member arranged to engage the side wall of the opening made to receive the expansion bolt and prevent rotation and longitudinal movement of the bolt relative to the wall after the bolt is positioned and the means projecting from the upper end of the member arranged to be engaged by the expander to prevent the disassembly of the hollow member and expander, the said means loosely positioned in the said slots and secured to the lower end of the exterior portion of the hollow member against longitudinal movement relative to the member, the upper end of the member expandable independently of the separately formed means positioned in the slots.

11. In an expansion bolt for installation in a drilled aperture comprising, a hollow shield formed with a plurality of yieldable sections spaced apart providing slots between the sections, an expander slidably mounted in the shield, a loop-shaped member loosely positioned in the slots and unaffected by lateral movement of the yieldable sections of the shield, the loop-shaped member secured to the shield member adjacent the inner end of the shield and projecting longitudinally from the outer end of the shield with the bight of the loop-shaped member spanning the adjacent end of the shield, the normal diameter of the outer end of the shield being greater than the normal diameter of the inner end of the shield, whereby the yieldable sections will engage the side walls of the aperture when the sections at the outer end of the shield are pressed inward to permit the shield to enter and be positioned in the aperture and the pressure then released thus preventing rotation of the shield relative to the wall, the combination with the expander of a threaded stud having a threaded engagement with the expander and an end of the stud arranged to engage the bight of said loop-shaped member when the stud is rotated relative to the shield and whereby continued rotation of the stud after the stud engages the loop-shaped member will cause the expander to move longitudinally of the shield and expand the yieldable sections into engagement with the said walls.

12. An expansion bolt comprising a cylindrical shell formed of a plurality of elongated yieldable sections extending substantially the entire length of the shell, the sections spaced from each other by longitudinal slots extending entirely through the shell wall for the entire length of the sections and each section having an internally tapered surface, a threaded expander normally positioned at the outer end of the shell and movable longitudinally into the shell, a rotatable stud having a threaded engagement with the expander to move the expander relative to the shell, the combination with the shell of separately formed means positioned in two of the oppositely disposed slots independent of the sections and secured to the shell adjacent the inner end of the said slots in which the said means is positioned, said separately formed means provided with bridging means spanning the outer end of the shell in longitudinally spaced relation thereto, the bridging means being engageable by the outer end-face of the stud, whereby the shell and expander may be positioned and supported in the opening provided therefor and rotation of the stud will effect movement of the expander into the shell to expand the same.

WARREN J. LEWIS.

References Cited in the file of this patent

UNITED STATES PATENTS

| Number | Name | Date |
|---|---|---|
| 406,565 | Church | July 9, 1889 |
| 731,931 | Millhausen | June 23, 1903 |
| 1,025,275 | Kennedy | May 7, 1912 |
| 1,119,843 | Law | Dec. 8, 1914 |
| 1,333,880 | Stine | Mar. 16, 1920 |
| 1,623,789 | Hubener | Apr. 5, 1927 |
| 1,790,841 | Rosen | Feb. 3, 1931 |
| 2,102,230 | Waterman | Dec. 14, 1937 |
| 2,198,964 | Goodyear | Apr. 30, 1940 |
| 2,399,069 | Skinner | Apr. 23, 1946 |

FOREIGN PATENTS

| Number | Country | Date |
|---|---|---|
| 402,375 | Great Britain | Nov. 30, 1933 |